United States Patent [19]

Morgan

[11] 4,005,493
[45] Jan. 25, 1977

[54] METHOD AND MEANS FOR MOVING RECORDING HEADS IN DISC-TYPE RECORDERS

[75] Inventor: Samuel A. Morgan, Ann Arbor, Mich.

[73] Assignee: Sycor, Inc., Ann Arbor, Mich.

[22] Filed: Feb. 25, 1975

[21] Appl. No.: 552,854

[52] U.S. Cl. .................. 360/106; 74/441; 360/97; 360/109
[51] Int. Cl.² .............. G11B 17/00; G11B 5/54; G11B 21/08
[58] Field of Search ......... 360/106, 74, 75, 77–78, 360/97–99, 109, 12; 74/441, 424.8 R, 424.8 A, 425, 25–28

[56] References Cited

UNITED STATES PATENTS

| 525,780 | 9/1894 | Boynton | 74/441 |
|---|---|---|---|
| 2,690,682 | 10/1954 | Passman | 74/441 |
| 3,001,414 | 9/1961 | Bourne | 74/441 |
| 3,025,604 | 3/1962 | Shelly | 74/441 |
| 3,682,481 | 8/1972 | Whitlock | 360/106 |
| 3,770,905 | 11/1973 | Sperry | 360/106 |
| 3,814,441 | 6/1974 | Craggs | 360/105 |
| 3,852,816 | 12/1974 | Stewart | 360/86 |
| 3,969,768 | 7/1976 | Ebbing | 360/106 |

Primary Examiner—Alfred H. Eddleman
Attorney, Agent, or Firm—Price, Heneveld, Huizenga & Cooper

[57] ABSTRACT

A data recorder/reproducer device, particularly for utilizing flexible magnetic disc media, is adapted to carry a recording head along at least one side of the disc. Translational drive means including a lead screw or worm driven by a stepper motor has a follower mounted thereon to which the recording heads are connected, for movement across the face of the disc generally radially thereof. Position-retaining means are provided for the follower, biased between it and the lead screw with sufficiently high spring force to prevent overtravel of the follower and to maintain accurate positioning of the follower and the heads moved thereon, and having a spring rate which prevents decoupling of the position-retaining means during rapid starts and stops of the lead screw. As a result, during each time interval between segments of rotation of the worm, the stepper motor may be de-energized, thereby eliminating a primary source of unnecessary and undesired heat, and at the same time reducing power consumption, leading to improved reliability and generally superior performance.

22 Claims, 6 Drawing Figures

METHOD AND MEANS FOR MOVING RECORDING HEADS IN DISC-TYPE RECORDERS

BACKGROUND OF THE INVENTION

Long-term data storage has long been accomplished on such media as magnetic tape and rigid magnetic discs, as well as punched paper cards and tape. More recently, the advent of flexible disc recording technologies have shown the advantages of the inexpensive, limp or "floppy" flexible discs, typically made by coating the opposite sides of a thin, highly flexible sheet of polymeric or other plastic film with magnetic oxide. This limply flexible disc is typically permanently enclosed within a close-fitting, sleeve-like protective outer envelope, in which it may be rotated while the envelope is held in position. The envelope has an enlarged, central opening for access to the center of the disc, and also has a radial slot opening, by which a magnetic head may access the face of the disc while the same is rotated.

A recorder/reproducer apparatus for flexible disc recording is shown in commonly assigned copending applications Ser. No. 418,299 filed Nov. 23, 1973 entitled FLEXIBLE DISC RECORDER CONSTRUCTION, now U.S. Pat. No. 3,913,137, and Ser. No. 518,501 filed Oct. 29, 1974 entitled DISC RECEIVER INTERLOCK FOR DISC RECORDERS, now U.S. Pat. No. 3,973,272.

In disc recorders generally, including those which use flexible discs of the type referred to above, a drive system is required for translational movement of the recording heads across the face of the discs while the latter are rotated. The heads must be advanced incrementally across the discs to predetermined positions, each of which represent an individual narrow, closely spaced, circular recording track on the disc. A common form of such a drive system in disc recorders generally as the voicecoil translator, a form of linear motor. Another system, well-suited for use in flexible disc recorders, comprises a stepper motor which drives a lead screw in incremental steps, with a follower threadedly engaged with the lead screw mounting or coupled to, the recording heads to move the same.

As the heads are positioned in alignment with the various recording tracks, it is important that they be accurately held in place, precisely located with respect to the extremely narrow record tracks. Where stepper motor drives have been utilized in such recorders in the past, the motors, which receive step voltage excitation to drive them in incremental steps, remain energized with a steady excitation to hold them in a given rotational position, and thus maintain the corresponding position of the lead screw and the recording heads, while transducing operations occur in the selected record track. The stepper motor is thus constantly energized, both during stepping or turning operation on the lead screw to advance the head, and also between steps, while transducing operations take place, to maintain the predetermined transducing position. Such constant operation of the stepper motor is a primary source of heat build-up within the apparatus, which is detrimental to the stability and longevity of practically all of the electrical and magnetic components and circuits in the recorder, even including the disc recording media and the motor itself. Nonetheless, positional accuracy for the heads is absolutely essential, and the otherwise undesirable heat build-up has thus heretofore been accepted as an unavoidable consequence, there being no accepted alternatives.

SUMMARY OF THE INVENTION

The present invention provides an improved method and means for moving the recording heads in disc-type recorders which overcomes difficulties such as those set forth above and encountered in devices of the prior art. More specifically, a novel, and superficially adverse, application of antibacklash means are provided on the lead screw and translational drive, whereby the stepper motor may be left totally unpowered between stepping functions, while precise and accurate head positioning is nonetheless achieved. Thus, undesired heat build-up within the recorder/reproducer apparatus is greatly reduced, as is power consumption. The novel antibacklash assembly on the follower and lead screw also serves to prevent overtravel of the heads as they are positioned by operation of the stepper motor, as well as fluctuations and shifting as a result of worm and follower backlash, thereby preventing shifting and misalignment of the heads with respect to the recorded tracks on the disc.

The foregoing major attributes of the invention, together with the advantages thereof, as well as other important attributes and advantages, will become more apparent following consideration of the ensuing specification and the accompanying drawings illustrating a preferred embodiment thereof.

DESCRIPTION OF THE PREFERRED EMBODIMENT

Figure 2:
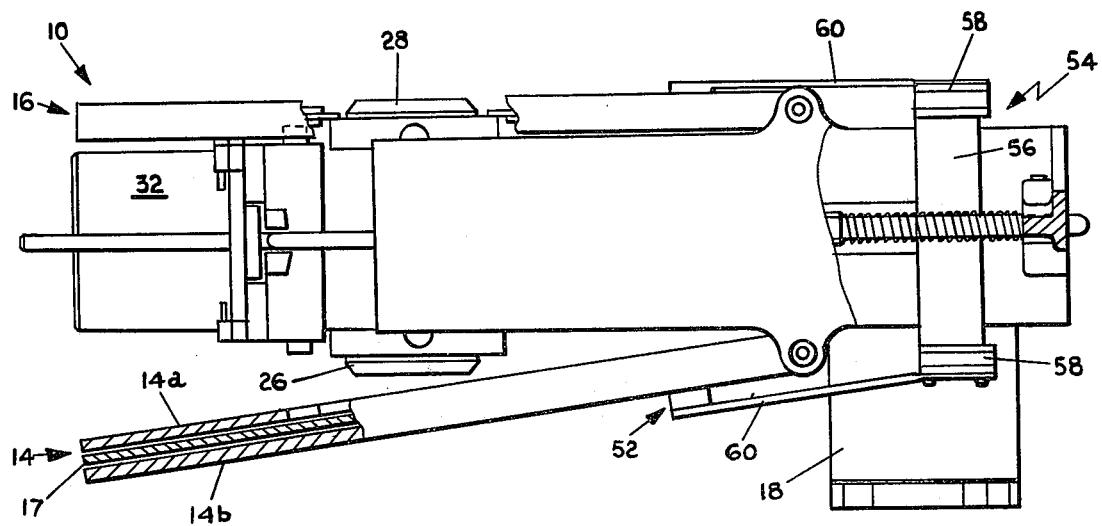
FIG. 2 is an overhead plan view of the apparatus of FIG. 1, showing one disc-receiver open for receiving a disc.

One particular embodiment of a recorder/reproducer apparatus 10 which incorporates the novel drive train system for moving the recording heads includes an upright central frame 12 which carries at least one, and preferably a pair of disc-receivers 14 and 16 (FIG. 2), each of which are pivotally hinged on either side of the frame, similar to doors. A disc unit 17 is positioned within each disc receiver, the same having a hollow interior for this purpose. Frame 12 defines what may be referred to as the central plane area of the recorder device, i.e., the generally planar central area sandwiched between the disc-receivers 14 and 16, which are generally parallel when in their closed positions. Also, the frame 12 mounts many of the operative components of the device, including a drive motor 18 whose output shaft is belt-coupled to a jack shaft 20 having hubs or pulleys 22 on each side of the frame, a drive shaft 24 having drive hubs 26, 28 at either end thereof, and an elongated lead screw or worm 30, together with a stepper motor 32 which drives lead screw 30, through a coupling 34 which will compensate for alignment tolerances. Also, the frame 12 mounts a straight, smooth guide rod 36 above and parallel to lead screw 30.

Figure 3:
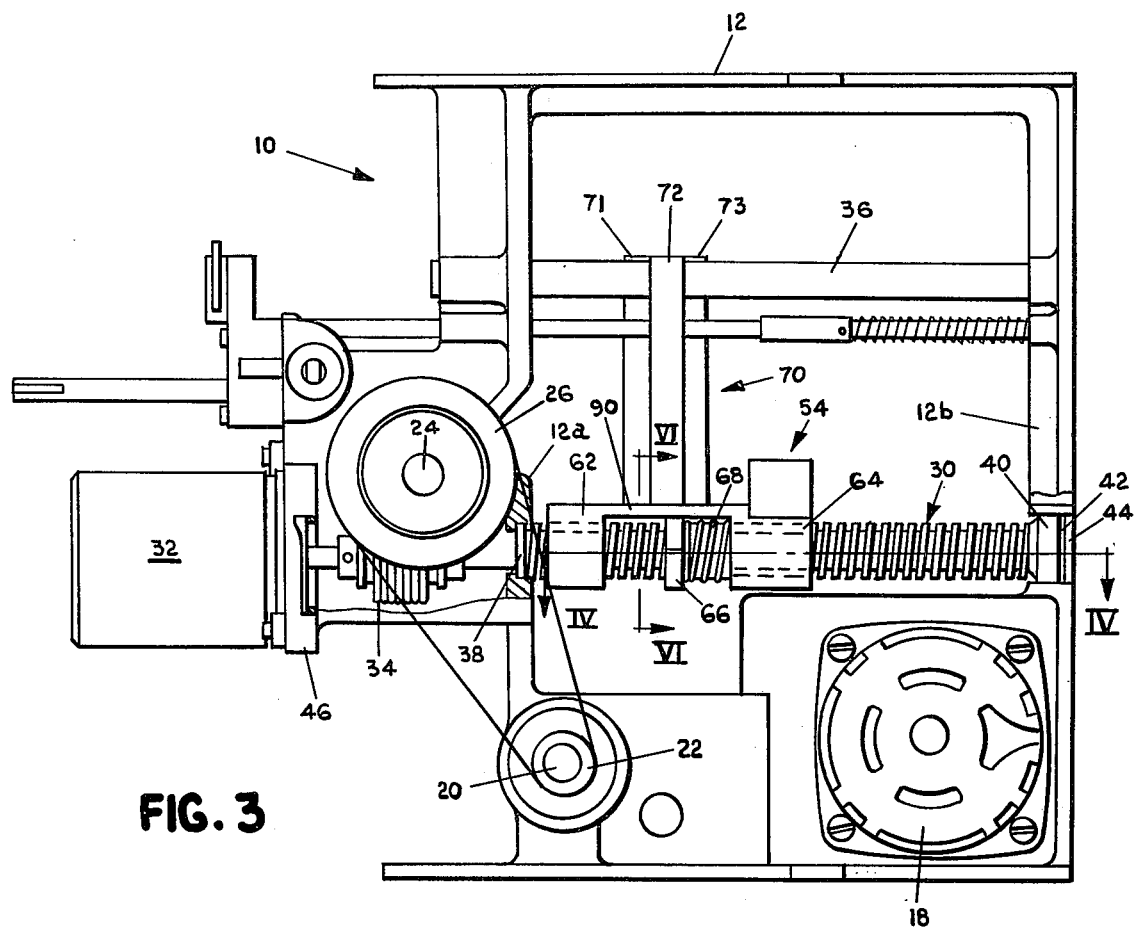
FIG. 3 is a side elevational view of the apparatus similar to FIG. 1 with the disc-receivers removed to show the means for moving the recording heads.

The lead screw or worm 30 is securely supported at each end, being mounted in bosses machined in upright supporting frame portions 12a, 12b located on either side of the frame 12, such bosses preferaly having bearings 38, 40 seated therein (FIG. 3). Bearing 40 seats against an internal shoulder inside its boss, and the worm is spring-loaded toward upright frame portion 12a (i.e., toward the left as seen in FIG. 3) by a wave-type spring thrust washer 42 disposed between the end portion of worm 30 and bearing 40, the latter being held firmly in position by a split retaining ring 44. Stepper motor 32 mounts upon a machined pad 46 formed as an integral part of frame 12, with the coupling 34 thus floating between the rigidly mounted motor and worm. Stepper motor 32 may be a conventionally-available motor, for example, a fifteen-degree incremental stepper.

Figure 1:
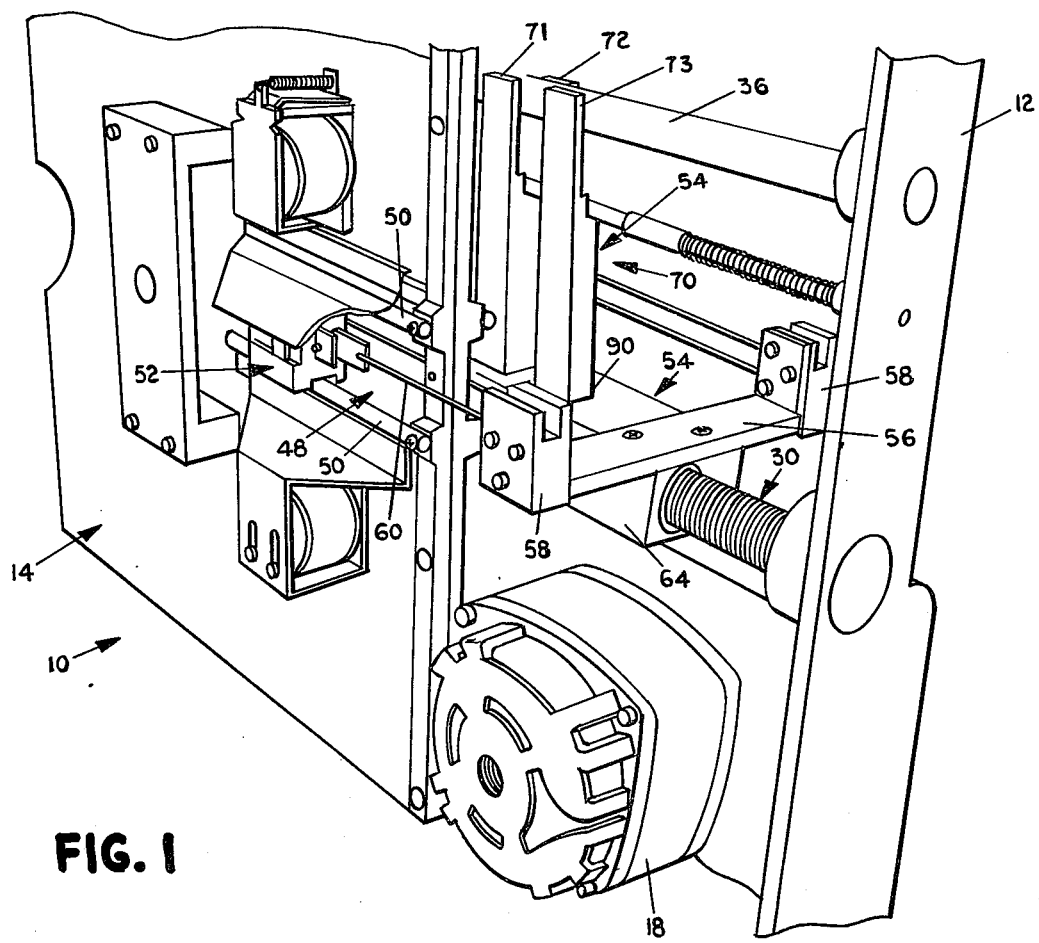
FIG. 1 is a partial perspective view of a data recorder/reproducer apparatus incorporating the novel means and method for moving the recording heads.

A rectangular opening 48 in each of the disc-receivers, mentioned previously, has a pair of spaced, parallel guide rods 50 (FIG. 1) mounted across it. The guide rods cooperatively operate with a head carrier member 52 to provide a head position referencing means. The rectangular opening 48 in the disc-receivers extends through both side portions 14a, 14b thereof (FIG. 2), and guide 50 have counterparts (not shown) mounted on the inside plate portion of each disc-receiver. The guide rods provide accurate referencing relative to the disc-receivers on which they are mounted. Each guide rod slidably supports a magnetic head carrier block 52, upon which a magnetic transducing head is rigidly supported.

The head carriers 52 are subjected to lateral sliding movement upon guide rods 50, thereby imparting translational or traversing movement to the transducing heads mounted thereon, radially across the face of the recording discs, i.e., in either lateral direction within an elongated radial slot in the disc envelope. This translational movement is obtained by coupling the head carriers 52 to a translator or follower 54 which is threadably mounted on lead screw or worm 30. For a more detailed discussion of the construction and operation of the recorder and reproducer apparatus, including the novel means for moving the recording heads, reference may be had to the above-identified, commonly assigned copending applications Ser. Nos. 418,299 and 518,501, incorporated herein by reference.

The traveling motion translator or follower device 54 is threaded on worm 30 to be moved thereby, upon rotation of the worm by the stepper motor 32. The translator or follower 54 has a transverse arm 56 with an upstanding leg portion 58 at each end. A link 60 connects leg 58 to head carriers 52. The follower also includes a pair of spaced bosses 62, 64 through which the worm threads pass. Boss 62 may serve as a guide while boss 64 is threaded to engage several turns of the worm thread, or both may be so threaded.

An important aspect of accurate position control for the follower 54, and thus also for the transducer heads carried thereby, involves the use of a threaded collar 66 which is threaded on to worm 30 and which cooperates with follower boss 64 and a bias spring 68 in a manner more fully described hereinafter to form an antibacklash and position-maintaining assembly which maintains accurate positioning of worm 30 after, and between, each rotation of stepper motor 32. Thus, when stepper motor 32 is stopped at selected positions, no overtravel or spurious movement of follower 54 occurs because of the positive cooperation between boss 64, collar 66 and bias spring 68.

Figure 4:
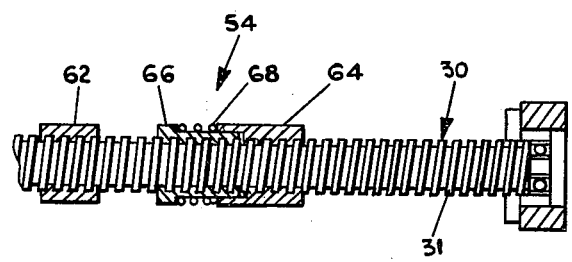
FIG. 4 is a fragmentary cross-sectional view taken along the plane IV—IV of FIG. 3.
Figure 6:
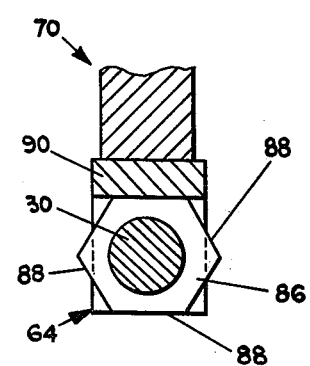
FIG. 6 is a fragmentary cross-sectional view taken along the planes VI—VI of FIG. 3.
Figure 5:
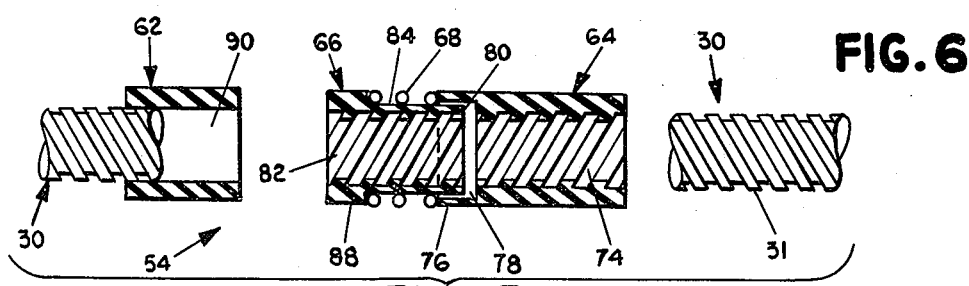
FIG. 5 is a fragmentary sectional view similar to FIG. 4, enlarged to show the details thereof with portions omitted for clarity.

Referring to FIGS. 4–6, the structural components used in the accordance with the invention are shown in somewhat greater detail. The lead screw 30 may be equipped with any of a wide variety of desired conventional thread arrangement; however, in a preferred embodiment a worm thread 31 is provided on a half-inch diameter shaft having ten threads per inch spaced thereon. The lead screw may conveniently have a lead of about one-half inch, i.e., it advances the follower 54 and the heads movable therewith about one-half inch across the face of the disc for each revolution of the stepper motor. More particularly, since in the preferred embodiment a fifteen degree incremental stepper motor is utilized, 24 separate increments are obtainable with each complete revolution of the lead screw; thus if the worm has a lead equal to 0.480 inches, each such increment of rotation will move the follower 0.020 inches.

Follower 54, including its bosses 62 and 64 (FIG. 3), is preferably integrally formed of molded Nylon or like relatively rigid material. Boss 64 is provided with internal threads 74 (FIG. 5) corresponding to threads 31 formed on lead screw 30. One end 76 of the boss 64 has an enlarged inner diameter section 78 adapted to receive one end 80 of collar 66. Collar 66 is also formed of Nylon, and is provided with internal threads 82 corresponding to the threaded portion 74 of boss 64. Collar 66 is additionally provided with a hexagonal shoulder 86 which serves both as a spring retainer which biases spring 68 against the end of boss 64 and additionally, when threadedly assembled on lead screw 30, prevents rotation of the collar with respect to boss 64. That is, flattened sides 88 (FIG. 6) of the hexagonal-shaped shoulder are selectively positionable into abutment with a connecting portion 90 of follower 54 (FIGS. 3 and 6), bridging bosses 62 and 64.

Boss 62 may be internally threaded like boss 64, but this is not essential. If unthreaded, the boss should have an axial inner diameter opening 92 therethrough, the diameter of which closely corresponds to the outer diameter of lead screw 30.

Spring 68, telescoped over the outer diameter of collar 66, is resiliently compressed between, and against, shoulder 86 of the latter and end part 76 of boss 64 (FIG. 5). Both the collar 66 and boss 64 are internally threaded and accordingly, with the lead screw threaded into these parts, as shown in FIGS. 3 and 4, spring 68 exerts a longitudinal biasing force which acts in a direction tending to push the collar 66 away from the boss 64. This spring force thus cooperatively creates a loading force on oppositely facing sides of the threads 31 of lead screw 30 which offers a predetermined controlled resistance to movement of the follower 54 along the lead screw, as well as to rotation of the latter. The amount of loading on the threads of the lead screw is controlled by both spring selection and the relative distance of the collar from the boss, which establishes the amount of compression of spring 68. In accordance with this invention, the extent of such thread loading, and the result which it enables to be produced, are of great importance since, while similar spring-loaded components have been used heretofore merely as anti-backlash devices in threaded drives, a different and overriding result is achieved in accordance herewith. That is, merely to achieve anti-backlash results, the spring-biased thread loading need only be slight, on the order (for example) of about four or five ounces spring force in a drive system comparable to that described above. In accordance with this invention, the loading to be used should be much greater, more on the order of from 1 to 2 pounds, for example.

This amount of loading would not normally even be considered for such a system since it clearly adds a high degree of frictional drag to follower movement and lead screw rotation, and this is normally considered to be very undesirable. Contrary to such thinking, however, some very desirable results can be so achieved since, in the first place, the position of the follower between steps along the lead screw is made essentially self-maintaining, with no other means required to obtain this important result, such as maintaining steady-state excitation on the stepper drive motor as is typically done. Thus, while a certain degree of additional power from the stepper motor, possibly requiring a slightly larger motor, is an expectable requirement from such a system due to the higher friction encountered, it may be appreciated that the total power consumed will actually be less, since the motor need not be kept steadily energized between steps in order to maintain follower and lead screw positioning steady. Instead, the motor may actually be deenergized during such time, thereby saving appreciable amounts of power, as may be readily appreciated in view of the fact that powered stepping is required only a small portion of the total operating time, with the majority of time spent in recording or replay operation on a particular given disc track.

Not only is power consumption itself less in accordance herewith, but the power saved was heretofore consumed essentially in unnecessary heat generation within the recorder; thus, in reducing power consumption the invention also commensurately reduces a primary source of heat generation, thereby providing significant additional benefits from the standpoint of performance, operational reliability, and component longevity. At the same time, increased follower positioning reliability is also obtained, since the follower is not subject to inadvertent drifting or other movement, such as by vibration or shock imparted to the recorder, and likewise the lead screw is not subject to inadvertent rotation, caused by or resulting in movement of the follower therealong.

It is also important that, in addition to providing the requisite degree of thread loading, as just described, the spring 68 has a sufficiently high spring rate to prevent decoupling of the thread-loading collar 66 and boss 64, occuring for example upon sudden starting and stopping of lead screw rotation and consequent follower movement, which would unpredicably vary and unload the force, against the threads which maintains the follower in position along the lead screw. For example, this result might occur if the spring rate of this spring was low compared to, or even approximating the value of, the resonant frequency of the follower mechanism, regarded as a mechanical system. Accordingly, in a preferred embodiment of the invention, the spring 68 has a spring rate which is approximately equal to twice the resonant frequency of follower assembly 54 and lead screw 30, considered as a mechanical system having a natural resonant frequency. More particularly, for a specific embodiment of a recorder drive such as that set forth hereinabove, spring 68 should have a spring rate on the order of two and one-half to three ounces per inch. For convenience of consideration, one way of considering the aforementioned desirable spring rate magnitude is simply, that rate which is at least sufficient to preclude decoupling of the collar, or loading nut, 66 and/or the threaded boss 64 from their forcible contact with the threads of the lead screw. Another suitable formulation is to state that the spring rate should be sufficient to withstand at least about one-half the accelleration "G" forces that are applied to the lead screw by the stepper motor during normal stepping operation; as a specific example, the frictional loading on the worm, in a recorder of the particular type shown and described, should withstand worst-cast vibration and shock stresses of on the order of from one to one-half G's, whereas standard expectable stepping accelleration forces on the order of two and one-half to three G's may be used. Alternatively, another ratio which may be considered is that of axial spring force (noted hereinabove as being on the order of one and one-half pounds) versus worm follower mass, which is less than one-half pound (typically much less than the latter). In all such examples, it may be seen that the minimum ratio of about one:two is present, the same as stated above with respect to the natural resonance of the worm and follower mechanism relative to the spring rate which should be used.

As the lead screw is rotated by the stepper motor to traverse the recording head across the disc and to stop the head at a predetermined position, continuous step excitation of the motor will produce continuous "stewing" motor rotation, resulting in smooth continuous traversing motion of the follower and heads carrier thereby. When such motor excitation ceases, however, follower movement ends immediately and abruptly, due to the loading force applied to the lead screw threads; consequently, no follower overtravel occurs. Accordingly, the stepper motor may be de-energized at any selected position and the lead screw and follower will accurately remain in that position due to the frictional forces imposed upon, and between, the lead screw and boss 64 and collar 66. As transducing operations take place between the head and disc, it is not necessary to maintain the stepper motor in an energized condition as in prior art devices, since the spring loading on the screw threads of shaft 30 positively holds follower 54 in position. As a result, since stepper motor 32 can be de-energized, internal heating and corresponding strain in the recorder apparatus is significantly reduced, as well as there being a significant reduction in the overall power consumption required by the apparatus.

It is entirely conceivablle that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows.

1. In a data recorder/reproducer apparatus having means for moving and positioning a transducing head with respect to a magnetic disc, said positioning means including a lead screw, drive means for rotating said lead screw, and a follower member coupled to said transducing head to move the latter upon movement of the follower and connected to said lead screw for movement along the same upon rotation thereof, the improvement comprising; said follower including a first member having at least a portion threadably received on said lead screw; a second member threadably received on said lead screw; biasing means between said first and second members for applying a force to said members acting generally axially of said lead screw and urging said first and second members into frictional engagement with said lead screw of a magnitude sufficient to constitute a friction brake, for securely holding said follower and said lead screw in fixed relative position and precluding undesired movement therebetween from causes other than powered actuation of said drive means.

2. The apparatus of claim 1 wherein said biasing means includes a spring member positioned between said first and said second members.

3. The apparatus of claim 2 wherein said first and said second members are adjustable axially relative to each other to thereby vary the biasing force of said spring member.

4. The apparatus of claim 2 wherein said spring has a spring rate which is at least on the order of magnitude of approximately twice the natural mechanical resonant frequency of said lead screw and follower as an assembly.

5. The apparatus of claim 1 wherein said drive means comprises an electrical stepper motor, said first and said second members cooperatively frictionally engaging said lead screw with sufficient force such that said motor need not remain energized to retain said follower in fixed position with respect to said screw.

6. The apparatus of claim 1 wherein said biasing means frictional engagement is on the order of magnitude of at least twice that conventionally applied under the same circumstances for anti-backlash purposes.

7. The apparatus of claim 6 wherein said biasing means frictional engagement force is on the order of magnitude of from four to eight times that conventionally applied under the same circumstances for anti-backlash purposes.

8. The apparatus of claim 1 wherein said biasing means frictional engagement force is sufficient to securely hold said follower and lead screw in fixed relative position during shock and vibration loading on said recorder/reproducer apparatus of up to about one-half the acceleration G force applied to said lead screw to impart rotation thereto by said drive means.

9. The apparatus of claim 1 wherein said biasing means frictional engagement force is on the order of magnitude of at least twice the mass of said follower mechanism.

10. In a data recorder/reproducer apparatus, of the type using a magnetic disc as the recording media, having at least one transducing head for recording and reproducing operations on said disc, means for holding said disc and said head in transducing proximity, and translational drive means for moving said head across said disc to predetermined positions for transducing operation therewith; said drive means including a lead screw, a follower mounted thereon and motor means for selectively rotating said lead screw to traverse said follower; the improvement comprising: means for preventing unpowered spurious movements of said lead screw, said preventing means including means for frictionally clamping said follower upon said lead screw upon cessation of motor means excitation and rotation of said lead screw caused thereby, and for preventing movement of the follower, thereby preventing subsequent unpowered lead screw movement to the extent that said motor means may be deenergized during given intervals and said head will remain in said predetermined position during such intervals.

11. The data recorder/reproducer apparatus of claim 10 wherein said preventing means includes a member engaging the threads of said lead screw and biasing means acting upon such member to urge the same into cooperative frictional engagement with said lead screw threads.

12. The apparatus of claim 11 wherein said biasing means has a spring rate of on the order of at least twice the natural frequency of mechanical resonance of said lead screw and said follower as a unit.

13. The apparatus of claim 12 wherein said biasing means includes a spring positioned between said thread-engaging member and a second member.

14. The apparatus of claim 13 wherein said second member also engages the threads of said lead screw.

15. A method of moving and positioning a transducing head in a recorder/reproducer device, comprising the steps: using a motor-driven lead screw and follower mechanism to impart movement to said head; applying friction loading to said lead screw and follower mechanism; using said friction loading to preclude headmoving motion of said mechanism as a result of forces less than the force produced by the drive motor for said mechanism; and using said friction loading as the primary operative means to hold the head in a given stationary position, rather than energizing said motor for such purpose.

16. The method of claim 15, wherein said friction loading is applied to the lead screw.

17. The method of claim 16, wherein said friction loading is applied to the threads of said lead screw.

18. The method of claim 16, wherein said friction loading is applied between the lead screw and its follower.

19. The method of claim 18, wherein said friction loading is applied between the lead screw and its follower by using a loading member threaded on said lead screw near said follower to force a resilient member against the follower thereby loading the latter axially of the lead screw and laterally against threads thereof in frictional engagement.

20. The method of claim 15 wherein said friction loading is applied by using a loading force against the follower in a magnitude on the order of at least twice the mass of the follower.

21. The method of claim 15 wherein said friction loading is applied sufficient to securely hold said follower and lead screw in fixed relative position during shock and vibration loading on said recorder/reproducer apparatus of up to about one-half the acceleration G force applied to said lead screw to impart rotation thereto.

22. The method of claim 15 wherein said friction loading is applied between the follower and the lead screw and the force of said loading is on the order of magnitude of at least twice that conventionally applied under the same circumstances for anti-backlash purposes.

* * * * *

UNITED STATES PATENT AND TRADEMARK OFFICE
CERTIFICATE OF CORRECTION

PATENT NO. : 4,005,493
DATED : January 25, 1977
INVENTOR(S) : Samuel A. Morgan

It is certified that error appears in the above-identified patent and that said Letters Patent are hereby corrected as shown below:

Column 4, line 10:

after "in" delete --- the ---;

Column 4, line 13:

"arrangement" should be --- arrangements ---;

Column 5, line 59:

"unpredicably" should be --- unpredictably ---;

Column 6, lines 13 and 14:

"accelleration" should be --- acceleration ---;

Column 6, line 18:

"worst-cast" should be --- worst-case ---;

Column 6, lines 20 and 21:

"accelleration" should be --- acceleration ---;

Column 6, line 28:

"one:two" should be --- 1:2 ---;

Column 6, lines 35 and 36:

"stewing" should be --- slewing ---;

UNITED STATES PATENT AND TRADEMARK OFFICE
CERTIFICATE OF CORRECTION

PATENT NO. : 4,005,493
DATED : January 25, 1977
INVENTOR(S) : Samuel A. Morgan

It is certified that error appears in the above-identified patent and that said Letters Patent are hereby corrected as shown below:

Column 6, line 37:

"carrier" should be --- carried ---;

Column 6, line 57:

"conceivablle" should be --- conceivable ---

Column 8, lines 60 and 61:

"accelleration" should be --- acceleration ---.

Signed and Sealed this

Twenty-first Day of June 1977

[SEAL]

Attest:

RUTH C. MASON
Attesting Officer

C. MARSHALL DANN
Commissioner of Patents and Trademarks